US012353559B2

(12) United States Patent
Edwards et al.

(10) Patent No.: US 12,353,559 B2
(45) Date of Patent: Jul. 8, 2025

(54) AGENTLESS ATTESTATION AS A SERVICE

(71) Applicant: HEWLETT PACKARD ENTERPRISE DEVELOPMENT LP, Spring, TX (US)

(72) Inventors: Nigel John Edwards, Bristol (GB); Blaine R. Southam, Ft. Collins, CO (US); Luis E. Luciani, Jr., Houston, TX (US); Darrell R. Haskell, Houston, TX (US); Nicholas Mark Hawkins, Houston, TX (US); Walton A. Rosen, Houston, TX (US); Guilherme De Campos Magalhaes, Rio Grande do Sul (BR); Kairo Cesar Pinto Tavares, Rio Grande do Sul (BR); Timothy Pletcher, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 129 days.

(21) Appl. No.: 18/460,237

(22) Filed: Sep. 1, 2023

(65) Prior Publication Data

US 2024/0419802 A1    Dec. 19, 2024

Related U.S. Application Data

(60) Provisional application No. 63/508,712, filed on Jun. 16, 2023.

(51) Int. Cl.
*G06F 15/177* (2006.01)
*G06F 9/00* (2018.01)
*G06F 21/57* (2013.01)

(52) U.S. Cl.
CPC ...... *G06F 21/575* (2013.01); *G06F 2221/034* (2013.01)

(58) Field of Classification Search
CPC .................. G06F 21/575; G06F 2221/034
See application file for complete search history.

(56) References Cited

U.S. PATENT DOCUMENTS

| 11,290,471 | B2 * | 3/2022 | Wang | G06F 21/564 |
| 11,531,760 | B1 * | 12/2022 | Righi | G06F 21/85 |
| 11,995,450 | B2 * | 5/2024 | Nadiminti | G06F 9/4406 |
| 12,086,258 | B1 * | 9/2024 | Righi | G06F 9/542 |
| 2013/0263205 | A1 * | 10/2013 | Jacobs | G06F 21/57 726/1 |
| 2021/0409223 | A1 * | 12/2021 | Subramanian | H04L 9/3213 |

(Continued)

OTHER PUBLICATIONS

DMTF, "Security Protocol and Data Model (SPDM) Specification", Version: 1.2.1, Jun. 23, 2022, 191 pages.

(Continued)

*Primary Examiner* — Xuxing Chen
(74) *Attorney, Agent, or Firm* — Sheppard Mullin Richter & Hampton LLP

(57) ABSTRACT

Systems and methods are provided for agentless attestation. Agentless attestation can measure the integrity of customer servers without requiring an agent software program to be downloaded to each of the enterprise computer devices. In particular, the system can integrate several standalone components to measure the integrity of monitored devices. This also allows the data center to authenticate, verify, audit, and update any hardware change, including a Platform Certificate.

20 Claims, 8 Drawing Sheets

(56) References Cited

U.S. PATENT DOCUMENTS

2023/0063428 A1* 3/2023 Nadiminti ............. H04L 63/126
2023/0325509 A1* 10/2023 Schroder ............... G06F 21/602
                                                              726/26
2024/0020387 A1* 1/2024 Gowda ................ H04L 9/3247

OTHER PUBLICATIONS

Keylime Contributors, "What is Keylime", available online at <https://web.archive.org/web/20210222205353/https://keylime.dev/>, Feb. 22, 2021, 4 pages.
Redfish, "Redfish Data Model Specification", Document Identifier: DSP0268, Version: 2022.2, Sep. 15, 2022, 1297 pages.
Trusted Computing Group, "TCG Platform Certificate Profile", available online at <https://trustedcomputinggroup.org/resource/tcg-platform-certificate-profile/>, 2023, 1 page.
Trusted Computing Group, "TCG Server Management Domain Firmware Profile Specification", Revision 1.00, May 1, 2020, 53 pages.

* cited by examiner

AGENTLESS ATTESTATION AS A SERVICE

CROSS REFERENCE TO RELATED APPLICATIONS

This application claims the benefit of and priority to U.S. Provisional Patent Application No. 63/508,712, filed on Jun. 16, 2023, the contents of which are incorporated herein by reference in their entirety.

BACKGROUND

Enterprise computer devices, such as servers, are often maintained and managed by a remote data center that installs an agent software application executed by the operating system of the enterprise computer devices. The agent can measure and verify the hardware configuration throughout the operational life of the system. This is relevant for edge locations where the risk of hardware tampering may be high.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
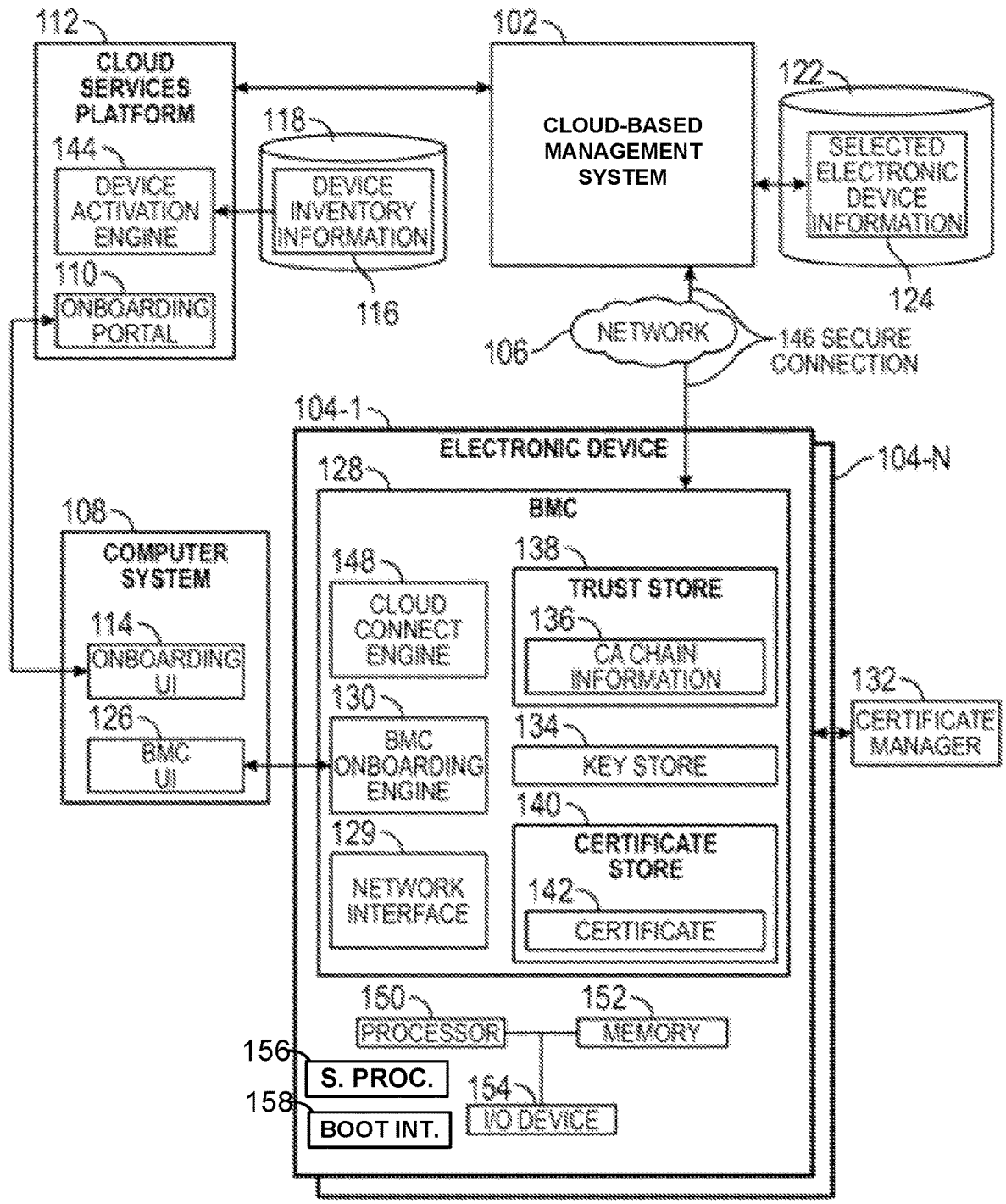
FIG. 1 is a block diagram comprising a cloud-based management system, cloud services platform, computer system, and a set of electronic devices, according to some examples of the system.

The figures are not exhaustive and do not limit the present disclosure to the precise form disclosed.

DETAILED DESCRIPTION

By requiring a customer to install the agent software application on any of its enterprise computer devices in order to be monitored by the remote data center, a maintenance burden is created between the customer and the data center. For example, the customer is required to download, install, configure, and patch the agent software application for any of its enterprise computer devices. As such, when the customer relies on the data center for maintenance and management of its computer devices, additional work and procedures are required by the customer to initiate and maintain the communications between the data center and the enterprise computer devices.

Agent-based monitoring can cause several issues. For example, traditional systems require that a customer install an agent to monitor the devices. Generally, the customer supplies, installs, and manages the operating systems running on proprietary servers, which will require the customer to install an agent on its proprietary servers. There is a significant barrier for the entities involved. For the customers, there is the burden of downloading, installing, configuring, and patching the agent on any of the proprietary servers. For the entity that provides the agent to the customer, the functionality of the agent must be updated and maintained for any of the operating systems used by the customers. Other technical issues may involve how to securely access the customer's use of access to management technology. The management technology has total control over the proprietary server, so access to any interferences into the environment may be tightly controlled. Another technical problem is the difficulty with verifying and updating Platform Certificates. These Platform Certificates correspond with industry-standard signed attestations of the principal hardware components in the chassis: memory modules, network and storage controllers, disk drives, power supplies, and more. For example, when hardware components are installed, such as Peripheral Component Interconnect Express (PCIe) devices. Such modifications can invalidate the Platform Certificate, so updated Platform Certificates are needed.

In some examples, the data center may forego installing the agent software application on the enterprise computer devices and instead implement a series of Application Programming Interface (API) calls to register the enterprise computer devices and monitor their real-time status. This process is referred to as "agentless attestation," associated with an attestation job, where the integrity of servers is monitored without installing the agent or other monitoring software on the devices.

Examples of the system described herein provide proprietary management technology that collects data to securely measure the state of the monitored devices using agentless attestation. Agentless attestation associated with an attestation job can measure the integrity of customer devices without requiring an agent software program to be downloaded to any of the enterprise computer devices. In particular, the system can integrate several standalone components to measure the integrity of the enterprise computer devices. This also allows the data center to authenticate, verify, audit, and update any hardware change, including a Platform Certificate.

Additionally, the system can assess and ultimately attest to the integrity of the monitored devices without having to exchange data/trust between different entities (e.g., a zero trust model) during the attestation job. For example, the system can measure and compare a cryptographic hash of firmware of the device with known (correct) reference values of the firmware of the device to validate that the firmware is the correct firmware to load and execute. In some examples, the expected reference values are published by a trusted authority. The system can move one layer up the firmware chain to the operating system during the attestation job to confirm the authenticity of the operating system as well. In this sense, the system can attest to the low level software that will start execution of the monitored devices and hand off the attested software to run the rest of the system. The customer can be confident that the operating system is running on firmware that is accurate and not malware that has been injected into the monitored devices. The system can cryptographically verify the state of the monitored devices.

Examples described herein are also distinct from typical agentless attestation system and also distinct from attestation using an agent installed on the monitored device. For example, the examples described herein may not require operating system services to be running on the monitored device because the attestation may be implemented and executed out-of-band entirely through a management processor associated with the cloud-based management system. Other agentless management systems may require the ability to login to the operating system of the monitored device to, for example, initiate machine-readable instructions or other commands. The examples described herein may not require this interaction with the operating system of the monitored device.

FIG. 1 is a block diagram comprising a cloud-based management system, cloud services platform, computer system, and a set of electronic devices, according to some examples of the system. In this example, cloud-based management system 102 that is to perform cloud-based management of electronic devices 104-1 to 104-N, where N is 1. Key store 134, trust store 138, and certificate store 140 can be contained in separate non-volatile memories or in the same non-volatile memory.

Cloud-based management system 102 can be part of a cloud environment that is separate from the customer premises where electronic devices 104-1 to 104-N are located. In some examples, the customer premises can be operated by a first entity, while the cloud-based management system can be operated by a second entity that is different from the first entity. Such entities that operate and/or own customer premises can include business concerns, government agencies, educational organizations, individuals, so forth. Additional features of cloud-based management system 102 are provided in FIG. 2.

Electronic device 104 may comprise baseboard management controller (BMC) 128 in electronic device 104. BMC 128 includes a network interface 129 that allows BMC 128 to communicate over network 106. BMC 128 is also configured to enable electronic device 104 to interact with BMC UI 126 at computer system 108. BMC 128 is communicatively coupled to certificate manager 132 over a network, such as the network 106 or a different network. Electronic device 104 further includes processor 150, memory 152, and input/output (I/O) device 154 (or multiple processors, multiple memories, and/or multiple I/O devices).

In some examples, electronic device 104 comprises security co-processor 156. One example of security co-processor 156 is a Trusted Platform Module (TPM). Security co-processor 156 may be implemented as a separate chip from processor 150 or may be implemented within a "super-chip" that includes both security co-processor 156 and processor 150. Security co-processor 156 may be discrete from processor 150 and the operating system of electronic device 104.

In some examples, security co-processor 156 may comprise Platform Configuration Registers (PCR). The PCRs may each store a different type of measurement values or data. When the measurement values are collected from electronic device 104, they can be stored at the appropriate security co-processor PCR (e.g., corresponding with computer-implemented rules) or appended to pre-existing values (e.g., to extend the values). For example, new measurement values may be concatenated with old measurement values that are previously stored in the security co-processor PCR. With the old data concatenated to the new data, the system may execute a hash function to generate a new measurement value to store in the PCR (e.g., new_value is a hash of an old_value and an argument_to_extend). By concatenating old values, a malicious actor that gains control of the system cannot set the PCRs to new measurement values that hide earlier measurements, and therefore escape the measurement process. As such, the system may advantageously implement an additional data security layer with the measurement values in any security co-processor PCR.

In some examples, electronic device 104 comprises a chassis (not shown). The chassis may correspond with a frame or other internal supporting structure on which electronics, including the motherboard or other circuits, are mounted. Measurement values corresponding with the chassis may include a temperature or other sensor values of the chassis.

In some examples, electronic device 104 comprises a bootloader shim (not shown). In some examples, the bootloader shim may be automatically executed to open an execute a second application. The second application may include, for example, a process to embed a particular certificate, like a Platform Certificate. The bootloader shim may be periodically updated to identify an up-to-date certificate. Measurement values corresponding with the bootloader shim may include a date or version number of the certificate, an identifier or location of the second application, or other values of the bootloader shim.

In some examples, electronic device 104 comprises a boot configuration (not shown). The boot configuration may be automatically updated to identify key-value data when booting the kernel of the device. The process may expand a current kernel command line to support additional key-value data. In some examples, the boot configuration may correspond with a command line process that identifies various measurement values, including a startup configuration identifier, a boot image of the device, or location of any of the above.

In some examples, electronic device 104 comprises a boot device (not shown). The boot device may comprise a storage medium or other location on the device where it identifies and loads the operating system or firmware during startup or reboot. Measurement values corresponding with the boot device may identify a location of the operating system or firmware, or corresponding identifier.

In some examples, electronic device 104 comprises a server motherboard (not shown). The server motherboard may aggregate several server components into one system, including memory capacity, processor speed, expansion capability, and networking components to enable the device to communicate via a network of computers, any of the above values may correspond with measurement values of the device.

Measurement values from any of the chassis, the bootloader shim, the boot configuration, the boot device, or the server motherboard may be determined. In some examples, BMC 128 may determine any of these measurement values associated with electronic device 104.

When the measurement values are transmitted to a different device (e.g., API gateway illustrated in FIG. 2), the measurement values (e.g., only new measurement values or concatenated new/old measurement values, or a hash of either value) may be accessed at the relevant security co-processor PCR, which previously authenticates the data, and transmitted to cloud-based management system.

In some examples, boot interface 158 (e.g., UEFI, BIOS) sends security co-processor 156 messages to record measurement values in PCRs at a first time. At a second time, boot interface 158 sends security co-processor 156 a first message to read the values of its PCRs and a second message to authenticate the measurement values by signing the values of its PCRS to the measurements.

In some examples, boot interface 158 may correspond with Unified Extensible Firmware Interface (UEFI), Basic Input/Output System (BIOS), or other interface associated with the boot procedure of electronic device 104. For example, BIOS may initiate a boot procedure based on firmware stored on an EPROM (Erasable Programmable Read-Only Memory) and UEFI may initiate a boot procedure based on a computer-readable instructions in a file (*.efi file) stored with the bootloader, instead of storing it in EPROM.

BMC 128 can refer to a specialized service controller that monitors the physical state of a computing node (e.g., any of electronic devices 104-1 to 104-N) using sensors and communicates with a remote management system (e.g., the cloud-based management system 102) (that is remote from the computing node) through an independent "out-of-band" connection. BMC 128 has management capabilities to manage components of the computing node.

Examples of management capabilities of BMC 128 can include any or some combination of the following: power control to perform power management of the computing node (such as to transition the computing node between different power consumption states in response to detected events), thermal monitoring and control of the computing node (such as to monitor temperatures of the computing node and to control thermal management devices of the computing node), fan control of fans in the computing node, system health monitoring based on monitoring measurement values of various sensors of the computing node, remote access of the computing node (to access the computing node over a network, for example), remote reboot of the computing node (to trigger the computing node to reboot using a remote command), system setup and deployment of the computing node, system security to implement security procedures in the computing node, and so forth.

In some examples, BMC 128 can provide so-called "lights-out" functionality for computing nodes. The lights out functionality may allow a user, such as a systems administrator, to perform management operations on the computing node even if an operating system (OS) is not installed or not functional on the computing node.

In some examples, BMC 128 can run on auxiliary power provided by an auxiliary power supply (e.g., a battery). As a result, the computing node does not have to be powered on to allow BMC 128 to perform the BMC's operations. The auxiliary power supply is separate from a main power supply that supplies powers to other components (e.g., main processor 150, memory 152, I/O device 154, etc.) of the computing node.

Electronic devices 104-1 to 104-N can be deployed on the customer premises and coupled to cloud-based management system 102 over network 106. As used here, "customer premises" can refer to any arrangement of electronic devices, such as within a data center, a cloud environment, a storage area network, a third party co-location, or any other location (whether private or public). Note that customer premises can be located at a single geographic location or multiple geographic locations.

Computer system 108 can communicate with cloud services platform 112 and electronic devices 104-1 to 104-N over a network, such as network 106. Cloud-based management system 102 can manage electronic devices 104 over network 106, such as a local area network (LAN), a wide area network (WAN), a public network (e.g., the Internet), and so forth. Examples of electronic devices 104 can include any or some combination of the following: server computers, desktop computers, notebook computers, tablet computers, smartphones, game appliances, Internet-of-Things (IoT) devices, home appliances, storage devices, communication nodes, vehicles, vehicle controllers, and so forth.

Secure connection 146 may be initiated over network 106. Secure connection 146 can include a WebSocket connection over Mutual Transport Layer Security (mTLS). In other examples, the secure connection can be a different type of connection. In further examples, due to the likelihood of network disruptions between electronic device 104-1 and cloud-based management system 102, techniques or mechanisms can be provided to keep the secure connection 146 alive and/or to retry the establishment of secure connection 146 in case secure connection 146 is dropped.

Computer system 108 can be used to enable cloud-based management of electronic devices, including electronic devices 104-1 to 104-N. Computer system 108 can include a desktop computer, a notebook computer, a tablet computer, or any other type of computer system. In some examples, computer system 108 can be used by a user (e.g., systems administrator or another user) to onboard electronic devices to be subject to cloud-based management. Although reference is made to a user at computer system 108 enabling cloud-based management of electronic devices, in other examples, a program or machine can initiate the onboarding of electronic devices 104-1 to 104-N for cloud-based management.

Computer system 108 allows a user to interact with onboarding portal 110 of cloud services platform 112. A "platform" can refer to a single computer or a collection of computers. In some examples, cloud services platform 112 provides a collection of cloud services such as user management, account management, authentication, authorization, and a portal, such as onboarding portal 110. In other examples, cloud services platform 112 can provide different services. A "portal" refers to a point of access of a device or service. For example, the portal can be at a specified uniform resource locator (URL), a network address (e.g., an Internet Protocol (IP) address), and so forth.

Although FIG. 1 depicts cloud services platform 112 separate from cloud-based management system 102, in other examples, cloud services platform 112 and cloud-based management system 102 can be part of a single platform. In some examples, onboarding portal 110 can be part of cloud-based management system 102.

In some examples, computer system 108 can present onboarding user interface (UI) 114 when accessing onboarding portal 110. The user at computer system 108 can use onboarding UI 114 to log into onboarding portal 110 using credentials of the user, such as a username and password or another credential.

In some examples, computer system 108 can present onboarding UI 114 when accessing cloud-based management system 102 to initiate an agentless attestation process as a service for various purposes, including for Compute Ops Management (COM). The user at computer system 108 can use onboarding UI 114 to onboard and identify devices to track using cloud-based management system 102.

Figure 2:
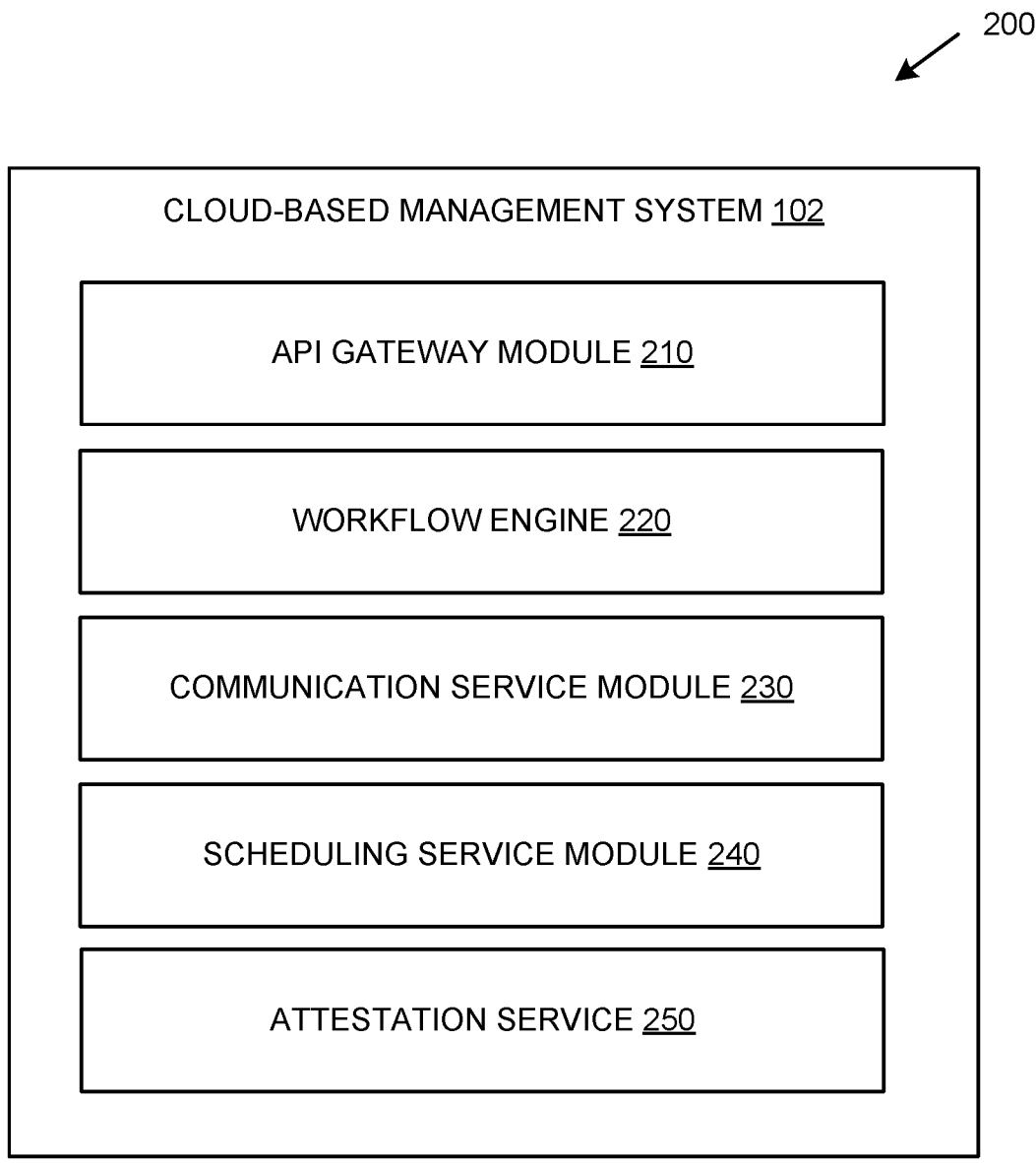
FIG. 2 is a block diagram comprising a cloud-based management system configured to perform cloud-based management of electronic devices, according to some examples of the system.

FIG. 2 is a block diagram comprising a cloud-based management system configured to perform cloud-based management of electronic devices, according to some examples of the system. In example 200, cloud-based management system 102 can comprise API gateway module 210, workflow engine 220, communication service module 230, scheduling service module 240, and attestation service 250.

API gateway module 210 is configured to provide an interface between the customer device and the system described herein. For example, the user may access onboarding UI 114 to select hardware devices to onboard and track. API gateway 210 may route the request to workflow engine 220, which has limited access to other engines and components of cloud-based management system 102. Additional information about the onboarding process is provided with FIG. 3.

API gateway module 210 is also configured to provide authorization and route requests to internal services cloud-based management system 102 that calculates various responses.

Workflow engine 220 is configured to orchestrate a number of processes to receive, determine, gather, merge, or transform data to fulfill the incoming request. For example, workflow engine 220 is configured to initiate or execute jobs on cloud-based management system 102. In some examples, workflow engine 220 runs pre-defined software programs that can access internal APIs, including the API associated with communication service module 230 to interact with BMC 128. The jobs associated with workflow engine 220 are inspected and trusted code. In some examples, the registration job invokes a credential verification process that comprises executing a series of automated requests to retrieve the platform and attestation key certificates from BMC 128 prior to initiating the attestation job of the electronic device or prior to receiving the measurement value of the electronic device. Once workflow engine 220 has this information, workflow engine 220 registers the server with attestation service 250, passing the certificates and other information retrieved from BMC 128.

Communication service module 230 is configured to direct communications to appropriate locations when communications are transmitted between the monitored device and cloud-based system. In some examples, the communications may be protected or otherwise authenticated and encrypted. For example, authentication may be required to communicate with electronic device 104-1, another monitored device, or other endpoint, like mTLS. Any communication without the proper authentication may automatically be dropped without connecting to the service.

Scheduling service module 240 is configured to determine a schedule of a service or other job. For example, scheduling service module 240 may determine a scheduled time to automatically initiate a periodic attestation of an electronic device (e.g., electronic device 104-1 once every 24 hours). A system-wide clock may be compared with the scheduled time and when the two sources of time match, the job may be initiated by scheduling service module 240.

In some examples, the periodic attestation of the electronic device may correspond with a notification from BMC 128. The notification may identify that a measurement value has changed and the attestation process should be initiated. Workflow engine 220 may initiate the attestation of the electronic device based on the notification from BMC 128 and, in some examples, scheduling service module 240 may automatically schedule the attestation in real-time.

Attestation service 250 is configured to provide integrity verification services for electronic devices 104. This can check the software (e.g., operating system) running on proprietary servers to build a chain of trust from the hardware incorporated with the proprietary servers (e.g., Root of Trust and network interface card (NIC), etc.) to the workload. Attestation service 250 is also configured to verify the authenticity of the platform and attestation certificates.

Attestation service 250 is also configured to register for any change events on electronic device 104-1. The change events may comprise, for example, reboot, hardware changes, etc.

Attestation service 250 is also configured to transmit an alert. For example, if the hardware inventory is different from the expected inventory, verification fails, and attestation service module 250 issues an alert through API gateway module 210.

Figure 3:
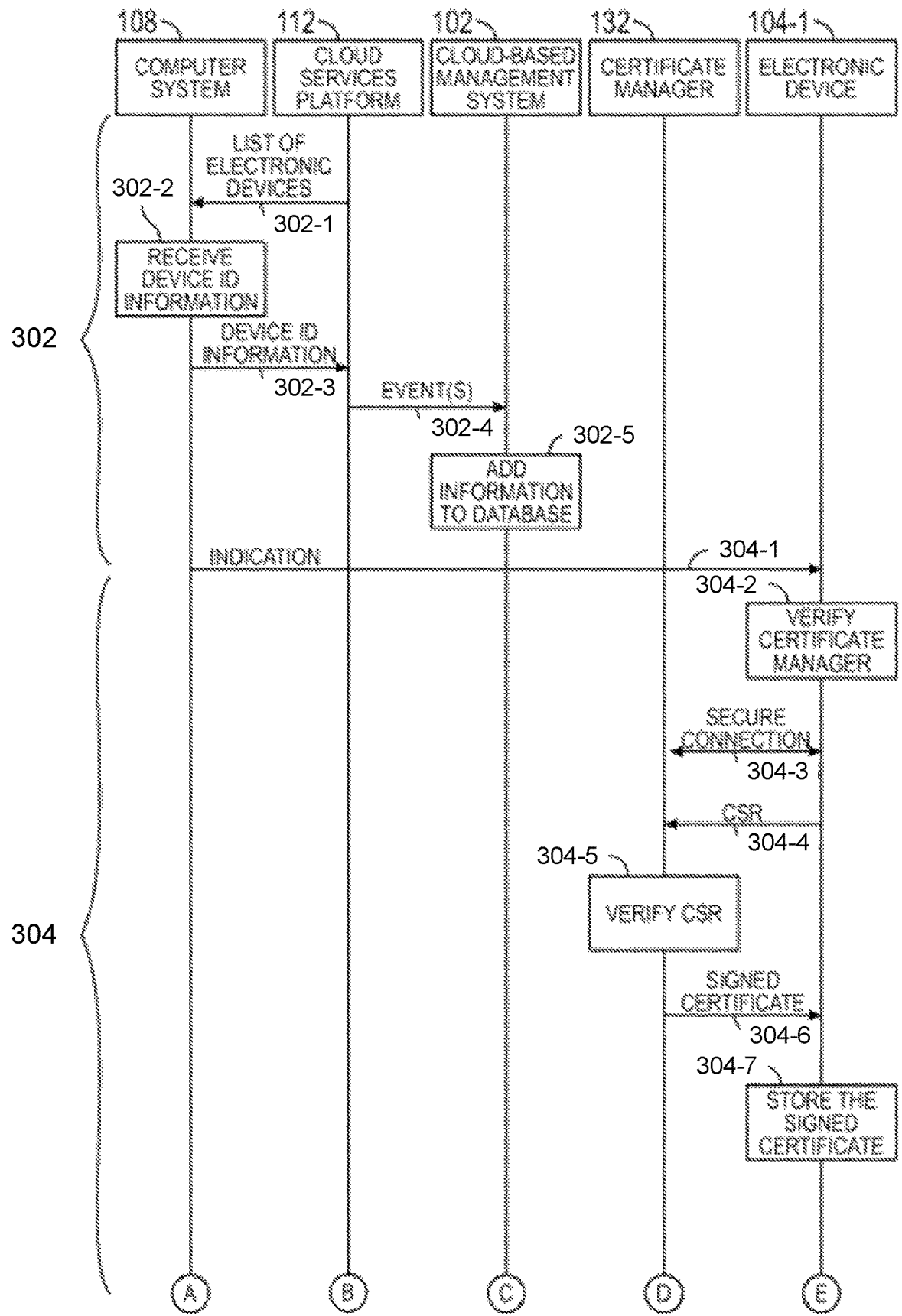
FIG. 3 is a flow diagram of a cloud-based management onboarding process, according to some examples of the system.
Figure 3:
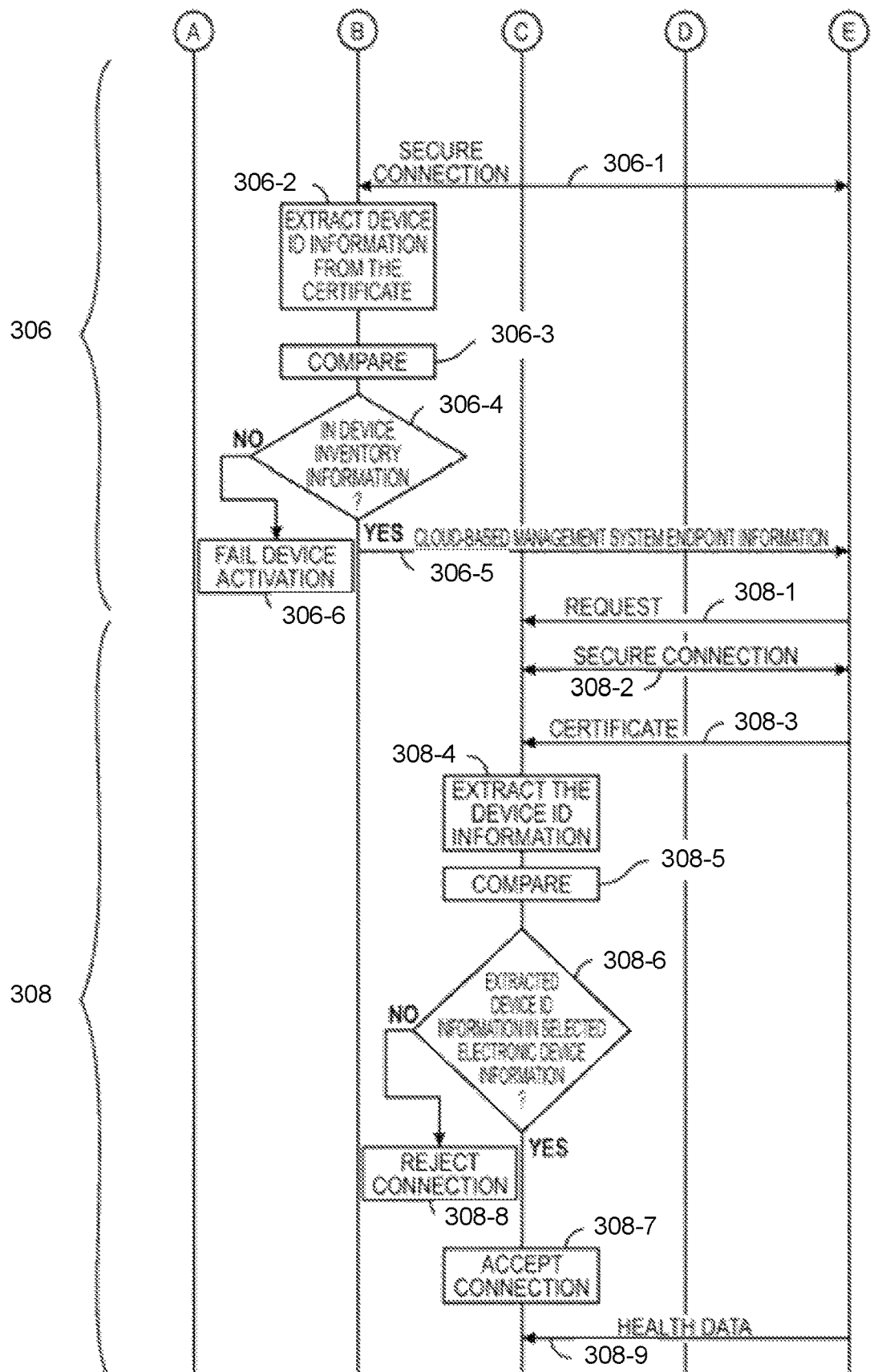

FIG. 3 is a flow diagram of a cloud-based management onboarding process, according to some examples of the system. The onboarding process may be implemented with a proxy device (prior to implementing agentless attestation) or implemented without an agent.

In some examples, the proxy device (implemented using hardware or machine-readable instructions) can be deployed on customer premises for purposes other than attestation. For example, the proxy device provides a communication channel between electronic devices to be managed and a cloud-based management system to perform onboarding operations. "Onboarding" an electronic device for cloud-based management can refer to performing tasks to allow the electronic device to establish a connection with a cloud-based management system so that remote management of the electronic device by the cloud-based management system can occur. In some examples, electronic devices on customer premises can initiate the connection with the cloud-based management system.

In some examples, after initiating the connection discussed above, an electronic device can publish information associated with the electronic device to the proxy device. The proxy device can send, in response to a device discovery request from the cloud-based management system, a response containing the information associated with the electronic device (as published by the electronic device) to the cloud-based management system.

Since the onboarding process involves the proxy device deployed at customer premises, the security of the onboarding process depends upon a security mechanism used between the proxy device and the cloud-based management system. For example, mutual Transport Layer Security (TLS) can be used to ensure mutual authentication between the two sides, and traffic is encrypted to secure communications. In some cases, security for the onboarding of electronic devices for cloud-based management can be complex and/or a suffer from vulnerabilities.

Figure 4:
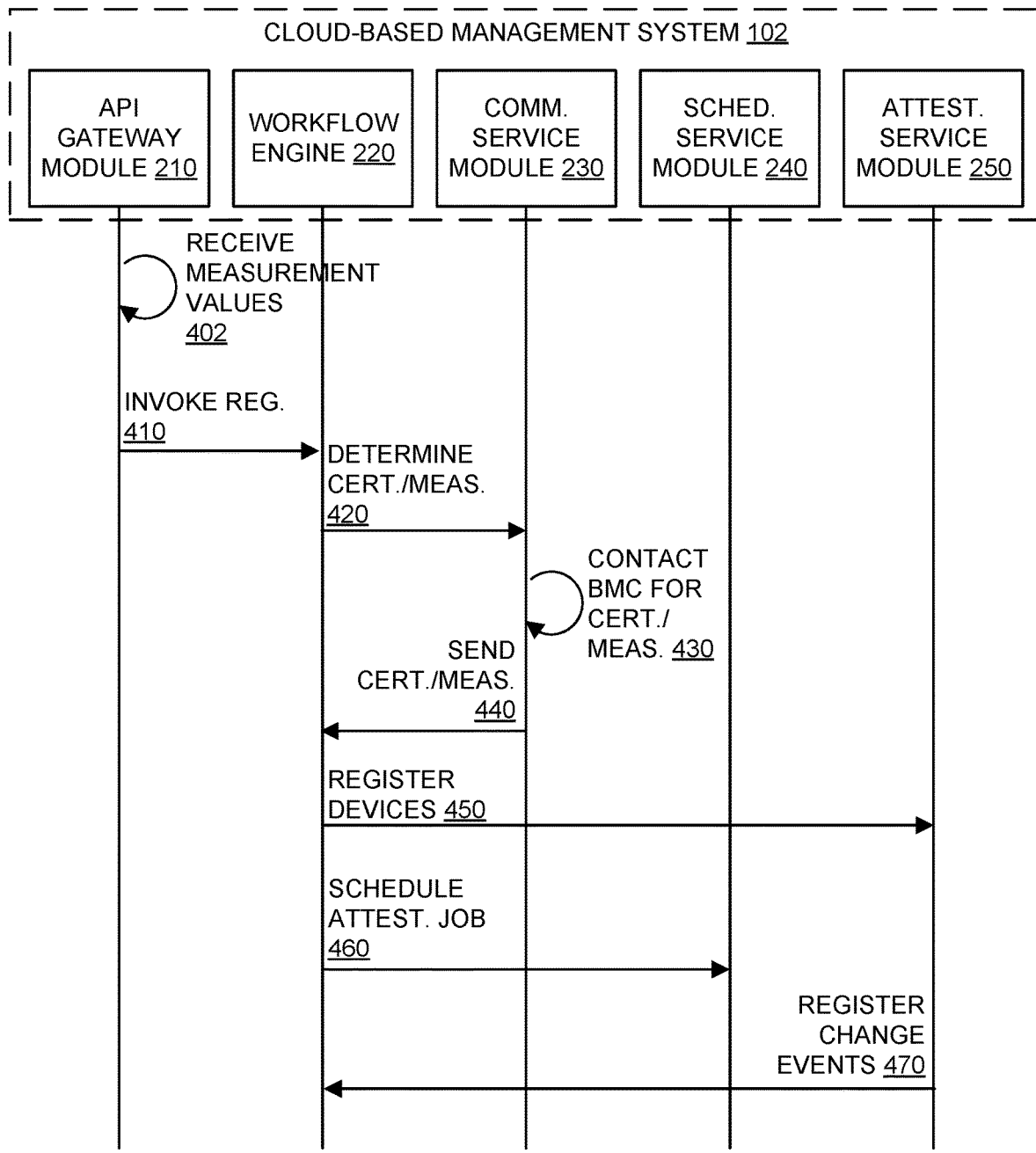
FIG. 4 is a high-level view of the workflow that takes place when a customer registers a server for integrity verification by the Security Platform, according to some examples of the system.
Figure 5:
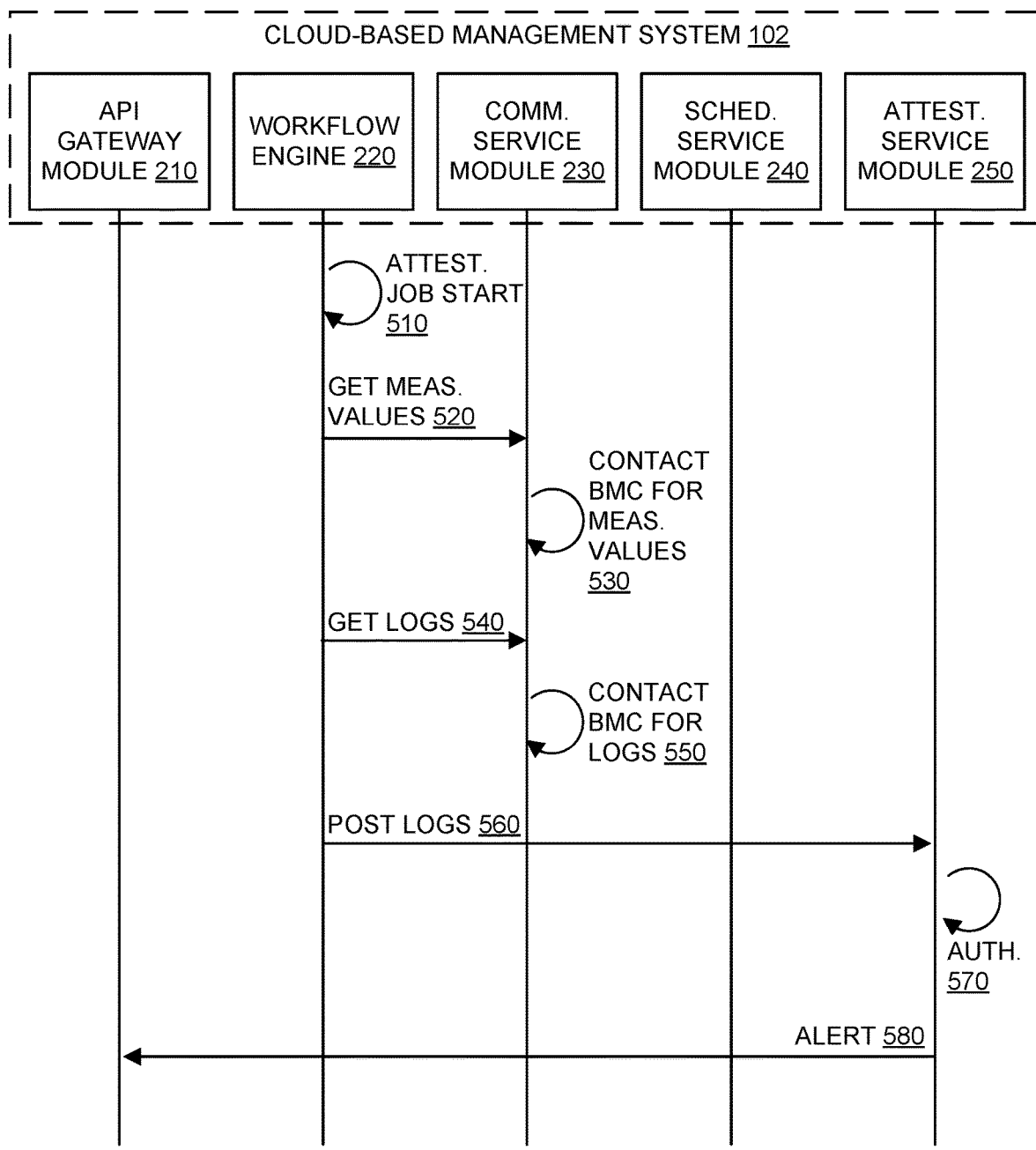
FIG. 5 is a high-level view of the workflow that takes place to attest and verify the server when the attestation job is scheduled by the Scheduling Service COM, according to some examples of the system.

In accordance with some implementations of the present disclosure, the proxy device may be used for implementing various onboarding techniques or mechanisms to onboard electronic devices for cloud-based management by a cloud-based management system in coordination with agentless attestation described in FIGS. 4 and 5. In some examples, the onboarding techniques or mechanisms use the proxy device with the electronic devices and a cloud service that provides information identifying electronic devices to be onboarded to the cloud-based management system. Once the electronic devices are onboarded to the system, using the proxy device described herein or another method, the cloud-based management system may attest to the status of the electronic device without an additional agent (e.g., agent-less).

At block 302, the user at computer system 108 initiates a process to identify electronic devices to be onboarded for cloud-based management. The process includes tasks 302-1 to 302-5.

At block 302-1, once the user has logged into onboarding portal 110, onboarding portal 110 can receive, from onboarding portal 110, a list of electronic devices that are associated with a customer account. A "customer account" can refer to an account of a customer (e.g., a business concern, an educational organization, a government agency, and individual, etc.). The customer may have registered with the customer account to list electronic devices that are eligible for cloud-based management.

The electronic devices associated with the customer account may be identified based on device inventory information 116 stored in a cloud services database 118. Device inventory information 116 can include device identification information such as any or some combination of: a serial number of an electronic device, a product identifier of the electronic device, a universally unique identifier (UUID), and so forth. Device inventory information 116 can associate different subsets of electronic devices with different customer accounts. Cloud services database 118 can be stored in a collection of storage devices, where a "collection of storage devices" can refer to a single storage device or multiple storage devices.

Computer system 108 can present, in onboarding UI 114, the list of electronic devices that are associated with a customer account. The user at computer system 108 can select, from the list presented in onboarding UI 114, electronic devices to be onboarded for cloud-based management by cloud-based management system 102. For example, the electronic devices in the list may have checkboxes or other user-selectable items next to respective identifiers of the electronic devices. In some examples, the identifiers can include names of the electronic devices, and/or serial numbers and product identifiers of the electronic devices. A product identifier can identify a line or category of products, whereas a serial number identifies a specific electronic device.

The user can select a checkbox for any electronic device that is to be subject to cloud-based management. In other examples, instead of selecting from a list in onboarding UI 114, the user can upload a list of electronic devices that are to be onboarded for cloud-based management. Other techniques for selecting electronic devices for onboarding can be employed.

At block 302-2, computer system 108 receives, based on the user selection, device identification information identifying the selected electronic devices.

At block 302-3, computer system 108 sends the device identification information identifying the selected electronic devices to onboarding portal 110. In some examples, the device identification information can include any or some combination of: serial numbers, product identifiers, UUIDs, etc. In other examples, the device identification information can include other types of electronic device identification data.

At block 302-4, for any electronic device that is selected to be onboarded, cloud services platform 112 can send a respective event to cloud-based management system 102. The event sent to cloud-based management system 102 can include device identification information for the respective electronic device. Although reference is made to sending an event for any corresponding selected electronic device, it is noted that in other examples, an event can be associated with multiple electronic devices, in which case the event can include device identification information of the multiple electronic devices. The event can also contain customer identification information to identify a customer with which the electronic devices are associated.

At block 302-5, cloud onboarding engine 120 in cloud-based management system 102 can add information associated with the selected electronic devices to a cloud-based management database 122. The information may be added in response to receiving a collection of events (including a single event or multiple events) relating to the selected electronic devices. The information added may be represented as selected electronic device information 124 in cloud-based management database 122. The selected electronic device information 124 can include device identification information and possibly other information.

The selected electronic device information 124 can also associate a state with any selected electronic device, where the state can be set to a first value to indicate that the electronic device is to be managed by cloud-based management system 102, and to a different second value if the electronic device is not to be managed by cloud-based management system 102.

At block 304, the user at computer system 108 initiates a process to enable a selected electronic device 104-1 to be monitored via cloud-based management. A similar process can be performed for any of the selected electronic device (s). The process includes tasks 304-1 to 304-7.

At block 304-1, BMC 128 includes BMC onboarding engine 130 that receives an indication through BMC UI 126 that cloud-based management for electronic device 104-1 is to be enabled. The indication can be provided in response to the user at the computer system 108 selecting a control item in BMC UI 126, entering a command in BMC UI 126, and so forth. For example, the user at computer system 108 uses BMC UI 126 to enable cloud-based management for an electronic device. In other examples, computer system 108 can enable cloud-based management for an electronic device in a different manner, such as by interaction through an interface (e.g., a Representational State Transfer (REST) interface or another type of interface, such as an application programming interface (API) or a different interface). In further examples, BMC 128 can auto-initiate a connection with computer system 108 when BMC 128 is powered on or otherwise started.

In response to the indication, BMC onboarding engine 130 initiates a process to obtain a certificate from a certificate manager 132, which can include a computer or a collection of computers, for example. In some examples, certificate manager 132 manages the provision of Public Key Infrastructure (PKI) certificates, which are digital certificates used to authenticate users or devices. In another example, electronic device 104-1 can be shipped from the factory with an unalterable certificate embedded in the hardware (e.g., in the BMC's certificate store 140) that provides similar functionality to the certificate obtained from certificate manager 132.

At block 304-2, BMC onboarding engine 130 verifies that certificate manager 132 can be trusted. BMC 128 may be pre-provisioned with a certificate authority (CA) chain for certificate manager 132, referred to as a "certificate manager CA chain." The certificate manager CA chain can be stored as part of CA chain information 136 in trust store 138. Trust store 138 may also be stored in a non-volatile memory of BMC 128. A CA chain (or chain of trust) is made up of a collection of certificates that start from a device's certificate and terminates with a root certificate. If the device's certificate is to be trusted, its signature has to be traceable back to the root CA. In the CA chain, each certificate may be signed by the entity that is identified by the next certificate along the CA chain. BMC onboarding engine 130 uses the certificate manager CA chain retrieved from trust store 138 to verify that certificate manager 132 can be trusted.

At block 304-3, BMC onboarding engine 130 may establish a secure connection with certificate manager 132. This process may be triggered once BMC onboarding engine 130 verifies certificate manager 132. BMC 128 is communicatively coupled to certificate manager 132 over a network, such as network 106 or a different network.

BMC 128 can establish the secure connection with the certificate manager 132 using the certificate manager CA chain. In some examples, the secure connection between BMC 128 and certificate manager 132 can include a Transport Layer Security (TLS) connection. In other examples, other types of secure connections can be established between BMC 128 and certificate manager 132.

At block 304-4, to obtain the certificate from certificate manager 132, BMC onboarding engine 130 sends a certificate signing request (CSR) to certificate manager 132 over the secure connection. The CSR includes a public key of a public-private key pair and the device identification information (e.g., any or some combination of the serial number, product identifier, UUID, etc.) of electronic device 104-1.

The public-private key pair (which includes the public key and a private key of the BMC 128) may be generated by cloud connect engine 148 in BMC 128. Cloud connect engine 148 is to establish a connection with a cloud service.

BMC 128 can include another entity, such as a security manager (not shown), that can be requested by cloud connect engine 148 to generate the public key and the private key of the public-private key pair. The private key can be encrypted and stored in key store 134, which can be stored in a non-volatile memory of BMC 128.

Although reference is made to an example in which cloud connect engine 148 and the security manager are involved in generating the public-private key pair, in other examples, the generation of the public-private key pair can be performed by another module in BMC 128 (e.g., BMC onboarding engine 130) or by a trusted entity outside BMC 128 or can be preloaded in BMC 128 at the factory.

At block 304-5, certificate manager 132 may verify the CSR in response to receiving the CSR.

At block 304-6, if certificate manager 132 is able to verify the CSR, certificate manager 132 sends a signed certificate to electronic device 104-1. The signed certificate refers to the certificate signed with a private key of certificate manager 132. The signed certificate can include device identification information (e.g., any or some combination of the serial number, the product identifier, the UUID, etc., of the electronic device 104-1) of electronic device 104-1.

At block 304-7, BMC onboarding engine 130 can store the signed certificate in certificate store 140 as certificate 142, in response to receiving the signed certificate. Certificate store 140 can be contained in a non-volatile memory of BMC 128.

At block 306, BMC onboarding engine 130 next initiates a device activation process 306 to activate electronic device 104-1 for establishing a connection with the cloud-based management system 102. The device activation process is performed with device activation engine 144 that is part of cloud services platform 112. In other examples, device activation engine 144 can be part of cloud-based management system 102. The process includes tasks 306-1 to 306-6. Note that the device activation process can be performed by any of electronic devices 104-1 to 104-N.

As illustrated herein, BMC 128 is provisioned with device endpoint information that refers to an endpoint that BMC 128 is to access for performing device activation of electronic device 104-1 for cloud-based management. In some examples, the device endpoint information (e.g., URL such as device.cloud.company.com or a network address, etc.) can identify a network location at which device activation engine 144 can be accessed.

At block 306-1, BMC onboarding engine 130 establishes, using certificate 142, a secure connection with device activation engine 144 over a network, such as network 106. As part of establishing the secure connection, BMC onboarding engine 130 verifies device activation engine 144 using a cloud services CA chain that is stored as part of CA chain information 136 in trust store 138. In some examples, the secure connection is an mTLS connection. mTLS refers to an extension of TLS to provide mutual authentication or Mutual Transport Layer Security (mTLS). In other examples, BMC onboarding engine 130 can establish a different type of secure connection with device activation engine 144.

At block 306-2, device activation engine 144 extracts the device identification information (e.g., any or some combination of the serial number, product identifier, the UUID, etc.) of electronic device 104-1 from certificate 142 received over the secure connection from BMC onboarding engine 130.

At block 306-3, device activation engine 144 compares the device identification information to device identification information in the device inventory information 116 contained in cloud services database 118.

At block 306-4, if device activation engine 144 determines that the device identification information of electronic device 104-1 is in the device inventory information 116, then device activation engine 144 can confirm that electronic device 104-1 is in fact an electronic device eligible for cloud-based management.

At block 306-5, in response, device activation engine 144 sends cloud-based management system endpoint information to BMC onboarding engine 130. The cloud-based management system endpoint information (e.g., a URL, a network address, etc.) identifies a location at which cloud-based management system 102 can be accessed.

At block 306-6, if the electronic device identified by the device identification information extracted from certificate 142 is not present in device inventory information 116, then the device activation process fails, and electronic device 104-1 is not onboarded for cloud-based management.

At block 308, BMC onboarding engine 130 initiates a device connection process with cloud-based management system 102 in response to successful device activation (indicated by the cloud-based management system endpoint information sent from device activation engine 144 to BMC 128). The device connection process may connect electronic device 104-1 to cloud-based management system 102 to allow the cloud-based management system 102 to manage electronic device 104-1. The device connection process includes tasks 308-1 to 308-9.

At block 308-1, cloud connect engine 148 initiates the establishment of secure connection 146 with cloud-based management system 102 by sending a request to cloud onboarding engine 120 at a location specified by the cloud-based management system endpoint information returned by device activation engine 144 to BMC onboarding engine 130 as part of the device activation process (block 306).

At block 308-2, in response to the request, cloud connection engine 148 in BMC 128 and cloud onboarding engine 120 in cloud-based management system 102 establish secure connection 146 with cloud-based management system 102 (or a module in cloud-based management system 102). As part of establishing secure connection 146, cloud connect engine 148 uses a cloud-based management system CA chain stored in CA chain information 136 in trust store 138, and cloud onboarding engine 120 can verify BMC 128 by using a certificate chain preloaded to cloud-based management system 102.

After establishment of secure connection 146 with cloud onboarding engine 120 of cloud-based management system 102, BMC onboarding engine 130 can interact with cloud onboarding engine 120 to complete onboarding of electronic device 104-1 for cloud-based management.

At block 308-3, BMC onboarding engine 130 can send certificate 142 to cloud onboarding engine 120.

At block 308-4, cloud onboarding engine 120 extracts the device identification information from certificate 142 sent by BMC onboarding engine 130.

At block 308-5, cloud onboarding engine 120 compares the extracted device identification information with device identification information in the selected electronic device information 124 stored in cloud-based management database 122.

At block 308-6, cloud onboarding engine 120 determines whether the extracted device identification information is in the selected electronic device information 124.

At block 308-7, cloud onboarding engine 120 accepts secure connection 146 in response to confirming that the extracted device identification information of electronic device 104-1 is in the selected electronic device information 124, and thus confirming that cloud-based management system 102 is to perform a cloud-based management of electronic device 104-1 over secure connection 146.

At block 308-8, if the extracted device identification information is not in the elected electronic device information 124, then cloud onboarding engine 120 would reject the establishment of secure connection 146, such that onboarding of electronic device 104-1 for cloud-based management by cloud-based management system 102 would fail.

At block 308-9, once secure connection 146 is accepted by cloud-based management system 102, BMC 128 sends device health data of electronic device 104-1 to cloud-based management system 102. Examples of device health data can include any or some combination of the following: status of a fan, status of memory 152, status of processor 150, status of a power supply, a temperature, device inventory information, and so forth.

The health data can be contained in data packets with headers that contain device identification information of electronic device 104-1. Cloud onboarding engine 120 in cloud-based management system 102 can compare the device identification information in the header of any data packet containing device health data to the selected electronic device information 124 to ensure that electronic device 104-1 was selected for cloud-based management. This additional check at cloud-based management system 102 provides a further security check that electronic device 104-1 is legitimate. The check based on health data can be omitted in other examples.

Before serving any requests from BMC 128 to cloud-based management system 102 for purposes of performing cloud-based management, BMC 128 expects a Redfish endpoint registration request from cloud onboarding engine 120. If BMC 128 does not receive the Redfish endpoint registration within a timeout interval, BMC 128 can tear down secure connection 146. Redfish refers to a standard to deliver management of electronic devices. More generally, BMC 128 expects a management registration request from cloud onboarding engine 120 of cloud-based management system 102, where the management registration request is to register handling of events from electronic device 104-1. Tearing down secure connection 146 if the management registration request is not received by BMC 128 within the timeout interval enhances security for the cloud-based management, since BMC 128 uses receipt of the management registration request as further confirmation that cloud-based management system 102 is legitimate.

For further security, BMC 128 can perform a scheduled teardown of secure connection 146, such as once every 24 hours or some other time period. Once secure connection 146 is torn down, device activation process 306 and device connection process 308 can be repeated.

FIG. 4 is a high-level view of the workflow that takes place when a customer registers a server for integrity verification by the Security Platform, according to some examples of the system. Cloud-based management system 102 can comprise API gateway module 210, workflow engine 220, communication service module 230, scheduling service module 240, and attestation service 250, as illustrated with FIGS. 1-2.

At block 402, API gateway 210 may receive measurement values. Various types of measurement values may be received, including measurement values calculated in association with initialization and startup procedures implemented by boot interface 158. The measurement values may comprise, for example, Unified Extensible Firmware Interface (UEFI) measurements. The UEFI measurements may comprise values that are measured during periodic time cycles of the monitored device components. The device components may comprise system configuration items, such as boot devices, boot configuration, a boot loader that is involved in the execution of machine-readable instructions, or other device components.

The measurement values may be authenticated by security co-processor 156 illustrated in FIG. 1. For example, the security co-processor 156 may comprise a set of PCR that each store a different type of measurement values. When the measurements are collected from the monitored device, they are stored at the appropriate security co-processor PCR. When the measurement values is transmitted to API gateway 210, the measurement values may be accessed at the relevant security co-processor PCR, which previously authenticates the data, and transmitted to cloud-based management system 102 via API gateway 210.

The measurements may be stored in a measurement log. When UEFI measures are implemented, the measurement log may correspond with a UEFI log. Other measurement logs may comprise device measurements of hardware components in the chassis, bootloader shim, boot configuration, boot device, hardware components of the monitored device, and other artifacts. These measurements may be recorded in the logs as hashes of each of the measurements.

In addition to measurements recorded by security co-processor 156, API gateway 210 can receive aggregated measurements of security critical devices on the device motherboard. These values include measurements taken directly by the baseboard management controller (BMC) in the electronic device during the Root of Trust startup process. The cloud-based management system can collect measurements from devices that are configured in accordance with the Security Protocol and Data Model (SPDM) Specification or measurements on Field Replaceable Units (FRUs) with smart devices in modular servers.

In some examples, boot interface 158 collects measurements of the monitored device. Just before it exits, it requests an attestation with BMC 128 rather than handing over control to the bootloader shim.

BMC 128 may also provide boot interface 158 with a nonce value when boot interface 158 requests attestation. The nonce value may be a random value that is unpredictable in advance of generating the nonce value (e.g., to prevent replay attacks). Boot interface 158 may provide the nonce value to a signature process executed by security co-processor 156 to generate a quote or other form of data signature. Using the quote/signature in this context may help validate the PCRs values and the nonce value because the nonce value is unknown to a fraudster. The fraudster may not replay an old correct measurement provided by boot interface 158 that were authenticated by an old signature, because the nonce value would be incorrect for the current transmission. BMC 128 can determine that it has a fresh quote.

The PCR values, logs, nonce value, and quote may be generated. Boot interface 158 then returns the PCRs, logs, and quote to API gateway 210, which is passes to workflow engine 220 later in the process.

At block 410, API gateway 210 may invoke the registration process by transmitting an invocation request to workflow engine 220. The invocation of the registration process may be triggered by the customer accessing API gateway 210 and requesting that cloud-based management system 102 assess and ultimately attest to the integrity of electronic devices 104-1 to 104-N.

At block 420, workflow engine 220 may initiate job service to determine certification and measurement values. Various certifications and measurements may be transmitted during this process. In some examples, the certification may correspond with platform and attestation key certificates that are stored on BMC 128. In some examples, there are three levels of certificates, including an IDEV-ID (provided in the factory during manufacturing), LDEV-ID (provided after distribution of the device and provisioned in the field), and a platform certificate (provided by the manufacturer for external consumption). Each of the certificates may identify the device. In some examples, the attestation keys and certificates correspond with the Initial Attestation Key (IAK, factory issued), Local Attestation Key (LAK, issued with an enrollment/registration process), and their certificates. The certificates may comprise, for example, a platform certificate, IDEV-ID certificate, LDEV-ID certificate, IAK certificate, and LAK certificate.

The measurement values may also be stored on BMC 128. The initiation by workflow engine 220 may limit exposure of communication service 230 to API gateway 210 and restrict access of this service to workflow engine 220 and other potentially external-facing services.

The job service initiated by workflow engine 220 may run pre-defined software programs that can access internal features of BMC 128 by retrieving the platform and attestation key certificates from BMC 128. The pre-defined software programs provided by workflow engine 220 may correspond with inspected and trusted code.

At block 430, communication service 230 may contact BMC 128 for platform and attestation key certificates and measurement values. BMC 128 returns the same. At block 440, communication service 230 may transmit the platform and attestation key certificates and measurement values to workflow engine 220.

At block 450, workflow engine 220 may initiate the device registration to attestation service module 250. For example, once workflow engine 220 has platform and attestation key certificates and measurement values, workflow engine 220 may register the monitored device with attestation service module 250. The registration of the job may include transmitting the certificates and other information retrieved from BMC 128 to attestation service module 250.

Attestation service module 250 can verify the authenticity of the platform and attestation certificates (not shown in the figure). For example, attestation service module 250 may verify the certificate chains (e.g., as specified in RFC 5280, section #6) by verifying that the IAK certificate is certified by a chain that is rooted in a trusted certification authority. Security co-processor 156 may use the IAK to sign the quote (e.g., providing a data signature of the PCR values and nonce value). Each PCR value may correspond with a digest of one or more measurements contained in boot interface 158 and log. A similar verification process may be implemented for the platform certificate.

At block 460, workflow engine 220 may schedule an attestation job with schedule service module 240. The penultimate step is to schedule a periodic attestation of the target server (e.g., once every 24 hours) using schedule service module 240.

In some examples, the attestation job may correspond with a notification from BMC 128. The notification may identify that a measurement value has changed and the attestation process should be initiated. Workflow engine 220 may initiate the attestation of the electronic device based on the notification from BMC 128 and, in some examples, scheduling service module 240 may automatically schedule the attestation in real-time.

At block 470, attestation service module 250 register change events with workflow engine 220. For example, attestation service module 250 registers for any change events on the servers: reboot, hardware changes, etc.

FIG. 5 is a high-level view of the workflow that takes place to attest and verify the server when the attestation job is scheduled by the scheduling service, according to some examples of the system. The scheduling service may correspond with schedule service module 240 illustrated in FIG. 2. In some examples, the process may correspond with the flow when the job executes at a previously scheduled time. When the job is scheduled, the job may be queued and be executed at the scheduled time (e.g., for future execution). Cloud-based management system 102 can comprise API gateway module 210, workflow engine 220, communication service module 230, scheduling service module 240, and attestation service 250, as illustrated with FIGS. 1-2.

At block 510, an attestation job process may be initiated by workflow engine 220. The attestation job started at a second time after the process illustrated in FIG. 4.

At block 520, workflow engine 220 may request the measurement values from communication service 230. For example, the attestation job retrieves the stored quote, stored measurement logs, and hardware from BMC 128 (e.g., using the Redfish API). Workflow engine 220 may not have communication access to BMC 128, so the communication may pass through communication service 230.

At block 530, communication service 230 may contact BMC 128 of electronic device 104 to retrieve the measurement values.

At block 540, workflow engine 220 may request the measurement logs and SCL data from communication service 230. Workflow engine 220 may not have communication access to BMC 128, so the communication may pass through communication service 230.

At block 550, communication service 230 may contact BMC 128 of electronic device 104 to retrieve the measurement logs.

In some examples, blocks 530 and 550 may be combined to execute in parallel or concurrently as one process. When blocks 530 and 550 are combined, block 550 may be executed automatically after the conclusion of blocks 530/540. When blocks 530 and 550 are executed as separate processes, the system may determine whether the PCR values have changed. If the PCR values are unchanged, the system can skip requesting the measurement logs because they would be repeated from the previous transmission and be unchanged as well At block 560, workflow engine 220 may post measurement logs to attestation service module 250. The attestation job retrieves the stored quote, stored measurement log, and hardware (H/W) data from BMC 128 (e.g., using the Redfish API). In some examples, security co-processor 156 may not sign the logs and instead sign the quote. The signed quote may help authenticate the values in the log.

In some examples, the quote is also requested by workflow engine 220 (not shown) from BMC 128. As discussed herein, BMC 128 may provide boot interface 158 with a nonce value when boot interface 158 requests attestation and boot interface 158 may provide the nonce value to a signature process executed by security co-processor 156 to generate a quote or other form of data signature. In this case, the quote, stored measurement log, and hardware data may be posted to attestation service module 250.

At block 570, attestation service module 250 may authenticate the measurement logs and end the attestation job process. For example, attestation service module 250 verifies the signature on the security co-processor 156 quote is from the attestation key in the server's attestation certificate.

The authentication process executed by attestation service module 250 also verifies that the values in the measurement logs and hardware data correspond to their respective PCRs, for example, the hardware data is authenticated by PCR 6. In some examples, attestation service module 250 may verify the reported hardware inventory is the same as the expected hardware inventory, held in cloud-based management database 122. In some examples, different PCRs can authenticate different parts of the measurement log.

Once attestation service module 250 has authenticated the log, the system may review any of these items to see if it is the expected item (e.g., expected hardware; expected boot configuration; expected boot loader/shim, etc.). To do, the system may access reference values that are stored with attestation service module 250 or implement a "trust on first use" process that can assume that the received item is what was expected. For example, if this is the first attestation after registration, cloud-based management database 122 will have been populated using data from the Platform Certificate retrieved during registration, so attestation service module 250 is verifying the Platform Certificate. The measurements provided by BMC 128 may also be organized into PCRs with measurement logs in an industry standard format. To extract them, a process to retrieve the signed measurement values is executed (e.g., TPMGetSignedMeasurements), referencing measurements from BMC 128. In other examples, a process to retrieve the SPDM measurements is executed (e.g., SPDMGetSignedMeasurements), referencing measurements from BMC 128.

At block 580, attestation service module 250 may transmit an alert to API gateway module 210. For example, if the hardware inventory is different from the expected inventory, verification fails because the integrity of the monitored device may be compromised, and attestation service module 250 issues an alert through API gateway module 210.

The alert will be rendered to the customer through an interface, like BMC UI 126 or other service (not shown in the figure). For example, the alert may be rendered by another service, user interface, API, or other component.

When the customer receives an alert, they can interact with interface 126 to see the hardware status. This will run workflow engine 220 "Hardware Status" job which uses attestation service module 250 to render the found hardware inventory, the expected hardware inventory, and the delta in the customer's user interface. The customer can choose to accept the found hardware inventory, in which case, a job execution process may be initiated to update the list of hardware. In some examples, the process uses attestation service module 250 to accept the current hardware inventory as authorized and expected.

In some examples, this process can be extended to issue an updated Platform Certificate. In some examples, Platform Certificates are X.509 attribute certificates bound to the security co-processor. Since attestation service module 250 already has the hardware and security co-processor details and has authenticated the security co-processor by the process of attestation, there is no need for a separate certificate signing request (or CSR). Attestation service module 250 issues the certificate on-demand, certifying that the change is authorized by an authorized channel partner.

To improve the scalability of the solution, the measurement values and hardware data may not be read after the first successful attestation. Instead, the system may retrieve the security co-processor PCRs that can be stored as files. A full attestation job may be executed if the PCR values have changed. When that happens, the measurement log or hardware data has changed.

In some examples, the system may support attestation of the bootloader, boot configuration, and firmware. This can provide deeper attestation, including the operating system kernel and components which is not possible using just UEFI.

Figure 6:
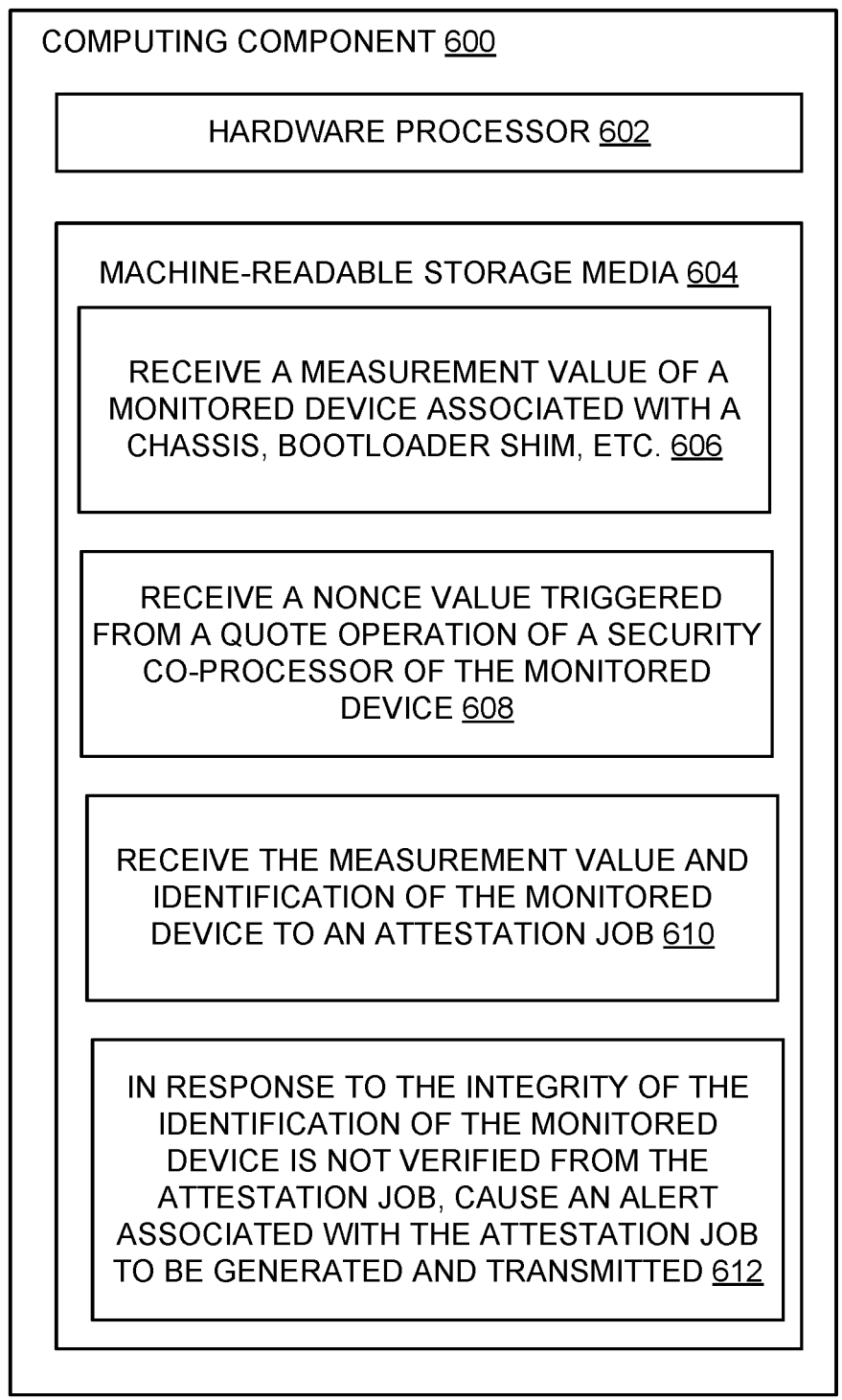
FIG. 6 illustrates an example computing component that may be used to implement agentless attestation as a service in accordance with various embodiments.

FIG. 6 illustrates an example computing component that may be used to implement agentless attestation as a service in accordance with various embodiments. Referring now to FIG. 6, computing component 600 may be, for example, a server computer, a controller, or any other similar computing component capable of processing data. In the example implementation of FIG. 6, computing component 600 includes hardware processor 602 and machine-readable storage medium 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-612, to control processes or operations for agentless attestation as a service. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EE- PROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612.

Hardware processor 604 may execute instruction 606 to receive a measurement value of the monitored device associated with a chassis, a bootloader shim, a boot configuration, a boot device, or a server motherboard. The measurement value may be received from a baseboard management controller (BMC) of a monitored device. Receiving the measurement value may be triggered prior to providing control of the monitored device to the bootloader shim.

In some examples, multiple hardware processors are implemented, including a main CPU that executes processing operations at the monitored device and a second processor corresponding with BMC 128 in FIG. 1. In some examples, hardware processor 604 and BMC of the monitored device may execute separate operations.

Hardware processor 604 may execute instruction 608 to receive a nonce value that triggered a quote operation with a security co-processor of the monitored device. One example of security co-processor 156 is a Trusted Platform Module (TPM). The nonce value may be received from the BMC. The nonce value may be received prior to providing control of the monitored device to the bootloader shim. The measurement value may be stored at the BMC and the nonce value may be transmitted to a boot interface of the monitored device.

Hardware processor 604 may execute instruction 610 to receive the measurement value of the monitored device from BMC and identification of the monitored device to an attestation job. For example, BMC may execute an instruction to provide the measurement value of the monitored device to hardware processor 604. The measurement value may be transmitted via secure connection 146 between BMC 128 and cloud-based management system 102 as illustrated in FIG. 1.

The attestation job may be initiated by workflow engine 220 of cloud-based management system 102 and pass through communication service 230 and contact BMC 128 of electronic device 104 to retrieve the measurement values, each of which are illustrated in FIGS. 1-2.

Hardware processor 604 may execute instruction 612 to cause an alert associated with the attestation job to be generated and transmitted. The alert may be generated and transmitted by attestation service 250 of cloud-based management system 102 as illustrated in FIGS. 1-2. The alert may be transmitted to an entity associated with the monitored device (e.g., systems administrator or another user) when the integrity of the monitored device is not verified from the attestation job.

In some examples, the alert may be generated when the attestation job cannot verify the integrity of the state of the monitored device, or the attestation job verifies that the integrity of the state of the monitored device is compromised. The verification of the integrity of the monitored device may fail based on information associated with, for example, the launched (expected) bootloader shim, the expected boot configuration, the boot device, the expected firmware, or the present hardware at the monitored device. An alert may be generated if the integrity is determined to be faulty or verification has failed.

Figure 7:
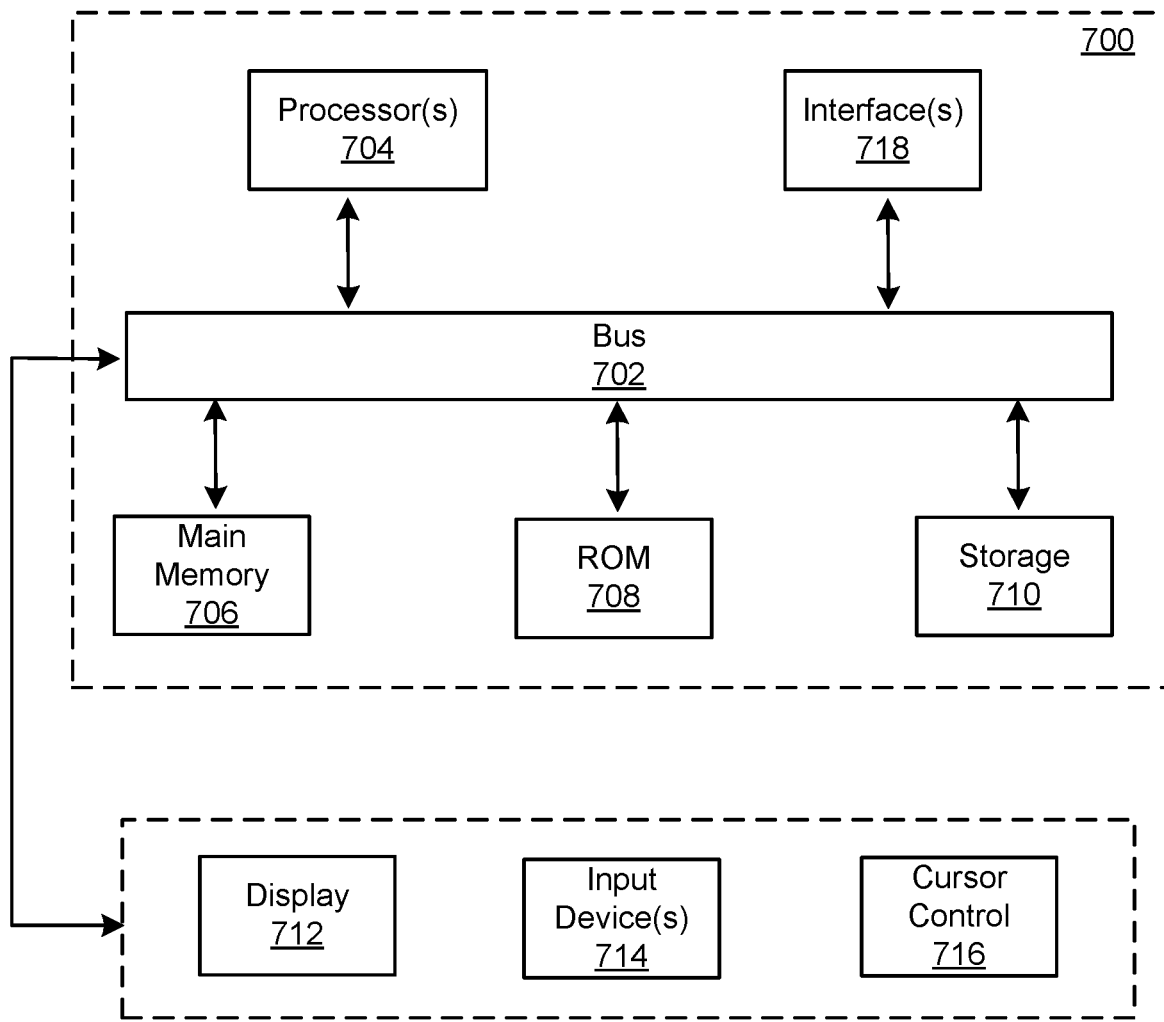
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read-only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Computer system 700 also includes network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 718, which carry the digital data to and from computer system 700, are example forms of transmission media.

Computer system 700 can send messages and receive data, including program code, through the network(s), network link and network interface 718. In the Internet example, a server might transmit a requested code for an application program through the Internet, the ISP, the local network and the network interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A cloud-based device management server comprising:
  a processor; and
  a non-transitory storage medium storing instructions executable on the processor to:
    receive, from a baseboard management controller (BMC) of a monitored device, a measurement value of the monitored device associated with a chassis, a bootloader shim, a boot configuration, a boot device, or a server motherboard,
    wherein receiving the measurement value is triggered prior to providing control of the monitored device to the bootloader shim;
    receive, from the BMC, a nonce value that triggered a quote operation with a security co-processor of the monitored device prior to providing control of the monitored device to the bootloader shim,
    wherein the measurement value is stored at the BMC and the nonce value is transmitted to a boot interface of the monitored device;
    receive, from the BMC via a secure connection, the measurement value of the monitored device and identification of the monitored device to an attestation job; and
    in response to integrity of the identification of the monitored device not being verified from the attestation job, cause an alert associated with the attestation job to be generated and transmitted to an entity associated with the monitored device.

2. The cloud-based device management server of claim 1, wherein the measurement value is received from a Unified Extensible Firmware Interface (UEFI) or Basic Input/Output System (BIOS) of the monitored device.

3. The cloud-based device management server of claim 1, wherein the instructions executable on the processor further to:
  before receiving the measurement value, receive a request to initiate a periodic attestation of the monitored device, wherein the periodic attestation accesses measurement logs of events with a reboot or hardware change of the monitored device.

4. The cloud-based device management server of claim 1, wherein the instructions executable on the processor further to:
  before receiving the measurement value, receive a notification from the BMC that the measurement value of the monitored device has changed.

5. The cloud-based device management server of claim 1, wherein the instructions executable on the processor further to:
  prior to receiving the measurement value of the monitored device, initiating a credential verification process that retrieves platform and attestation key certificates that are stored on the BMC of the monitored device.

6. The cloud-based device management server of claim 4, wherein the platform and attestation key certificates correspond with a platform certificate, an Initial Attestation Key (IAK), and a Local Attestation Key (LAK).

7. The cloud-based device management server of claim 1, wherein the attestation job comprises transmitting certificates and other information retrieved from the BMC to an attestation service module.

8. The cloud-based device management server of claim 1, wherein the measurement value of the monitored device associated with the chassis, the bootloader shim, the boot configuration, the boot device, or the server motherboard are concatenated with old measurement values that are previously stored in the security co-processor.

9. The cloud-based device management server of claim 1, wherein the measurement value of the monitored device associated with the chassis, the bootloader shim, the boot configuration, the boot device, or the server motherboard is a hash of old measurement values that are previously stored in the security co-processor and the measurement value.

10. A method comprising:
  receiving, from a baseboard management controller (BMC) of a monitored device, a measurement value of the monitored device associated with a chassis, a bootloader shim, a boot configuration, a boot device, or server motherboard,
  wherein receiving the measurement value is triggered prior to providing control of the monitored device to the bootloader shim;
  receiving, from the BMC, a nonce value that triggered a quote operation with a security co-processor of the monitored device prior to providing control of the monitored device to the bootloader shim,
  wherein the measurement value is stored at the BMC and the nonce value is transmitted to a boot interface of the monitored device;
  receiving, from the BMC via a secure connection, the measurement value of the monitored device and identification of the monitored device to an attestation job; and
  in response to integrity of the identification of the monitored device not being verified from the attestation job, causing an alert associated with the attestation job to be generated and transmitted to an entity associated with the monitored device.

11. The method of claim 10, wherein the measurement value is received from a Unified Extensible Firmware Interface (UEFI) or Basic Input/Output System (BIOS) of the monitored device.

12. The method of claim 10, further comprising:
  before receiving the measurement value, receiving a request to initiate a periodic attestation of the monitored device, wherein the periodic attestation accesses measurement logs of events with a reboot or hardware change of the monitored device.

13. The method of claim 10, further comprising:
  before receiving the measurement value, receiving a notification from the BMC that the measurement value of the monitored device has changed.

14. The method of claim 10, further comprising:
prior to receiving the measurement value of the monitored device, initiating a credential verification process that retrieves platform and attestation key certificates that are stored on the BMC of the monitored device.

15. The method of claim 14, wherein the platform and attestation key certificates correspond with a platform certificate, an Initial Attestation Key (IAK), and a Local Attestation Key (LAK).

16. The method of claim 10, wherein the attestation job comprises transmitting certificates and other information retrieved from the BMC to an attestation service module.

17. The method of claim 10, wherein the measurement value of the monitored device associated with the chassis, the bootloader shim, the boot configuration, the boot device, or the server motherboard are concatenated with old measurement values that are previously stored in the security co-processor.

18. The method of claim 10, wherein the measurement value of the monitored device associated with the chassis, the bootloader shim, the boot configuration, the boot device, or the server motherboard is a hash of old measurement values that are previously stored in the security co-processor and the measurement value.

19. A non-transitory computer-readable storage medium storing a plurality of instructions executable by a processor, the plurality of instructions when executed by the processor causes the processor to:
receive, from a baseboard management controller (BMC) of a monitored device, a measurement value of the monitored device associated with a chassis, a bootloader shim, a boot configuration, a boot device, or a server motherboard,
wherein receiving the measurement value is triggered prior to providing control of the monitored device to the bootloader shim;
receive, from the BMC, a nonce value that triggered a quote operation with a security co-processor of the monitored device prior to providing control of the monitored device to the bootloader shim,
wherein the measurement value is stored at the BMC and the nonce value is transmitted to a boot interface of the monitored device;
receive, from the BMC via a secure connection, the measurement value of the monitored device and identification of the monitored device to an attestation job; and
in response to integrity of the identification of the monitored device not being verified from the attestation job, cause an alert associated with the attestation job to be generated and transmitted to an entity associated with the monitored device.

20. The non-transitory computer-readable storage medium of claim 19, wherein the plurality of instructions further cause the processor to:
before receiving the measurement value, receive a request to initiate a periodic attestation of the monitored device, wherein the periodic attestation accesses measurement logs of events with a reboot or hardware change of the monitored device.

* * * * *